United States Patent [19]

Lewis

[11] 4,032,758
[45] June 28, 1977

[54] COMPENSATED VEHICLE HEADING SYSTEM

[75] Inventor: Richard W. Lewis, Derby, Kans.

[73] Assignee: The Boeing Company, Seattle, Wash.

[22] Filed: Nov. 5, 1975

[21] Appl. No.: 629,119

[52] U.S. Cl. .............................. 235/150.2; 33/319; 180/79.1; 235/150.27; 318/587
[51] Int. Cl.² ..................... G06F 15/50; B62D 5/00
[58] Field of Search ..... 235/150.2, 150.26, 150.25, 235/150.27, 92 N, 92 MS, 92 EV, 92 CA, 92 DM; 33/317 D, 319, 326; 73/178 R; 180/79.1, 98; 244/50, 175, 189; 318/580, 587; 114/144 E; 340/146.2, 53; 335/296; 346/8

[56] References Cited

UNITED STATES PATENTS

| 3,390,378 | 6/1968 | Dryden | 340/146.2 |
|---|---|---|---|
| 3,593,093 | 7/1971 | Bettcher | 114/144 E |
| 3,665,386 | 5/1972 | Dosch | 340/53 |
| 3,668,624 | 6/1972 | Spaulding | 180/98 |
| 3,685,478 | 8/1972 | Casani et al. | 114/144 E |
| 3,741,474 | 6/1973 | Kawada et al. | 114/144 E |
| 3,746,842 | 7/1973 | Fowler | 235/92 CA |
| 3,749,893 | 7/1973 | Hileman | 235/150.27 |
| 3,789,198 | 1/1974 | Henson et al. | 235/150.27 |
| 3,844,051 | 10/1974 | Wiklund | 33/317 D |
| 3,930,142 | 12/1975 | Meier | 235/92 CA |
| 3,943,345 | 3/1976 | Ando et al. | 235/150.2 |

Primary Examiner—Malcolm A. Morrison
Assistant Examiner—Errol A. Krass

Attorney, Agent, or Firm—Christensen, O'Connor, Garrison & Havelka

[57] ABSTRACT

A compensated vehicle heading system wherein magnetic heading information is combined with heading information determined by sensing vehicle dynamic movement to provide augmented heading information is disclosed. The magnetic heading information is provided by a magnetic heading sensor. The heading information determined by sensing vehicle dynamic movement is provided by a vehicle dynamic system that senses vehicle direction changes. In one form, the vehicle dynamic system includes magnetic sensors mounted so as to sense the speed of rotation of the undriven wheels of a land vehicle and generate pulse chains in accordance therewith. These pulse chains are scaled and applied to an UP/DN counter. The output of the UP/DN counter is continuously compared with the magnetic heading information and the results of the comparisons control the gating of a trickle pulse addition to the scaled pulse chains applied to the UP/DN counter. The thusly controlled output of the UP/DN counter is the augmented heading information. The trickle pulses are created by dividing the pulse chain related to one of the undriven wheels by a predetermined factor. In addition, the UP/DN counter is set to the magnetic heading state when the system is initially activated. Further, errors are prevented by interconnecting the pulse chains such that no more than one pulse can be gated to the UP/DN counter from a particular wheel when the other wheel stops producing pulses.

16 Claims, 3 Drawing Figures

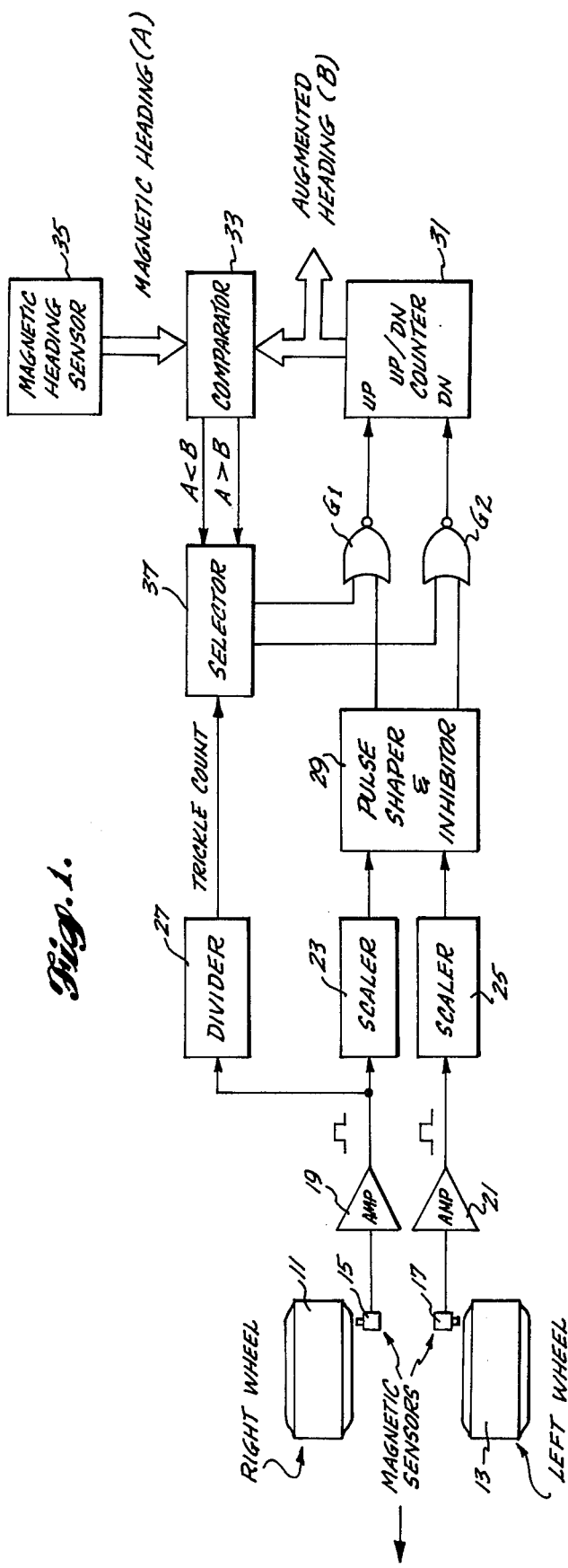
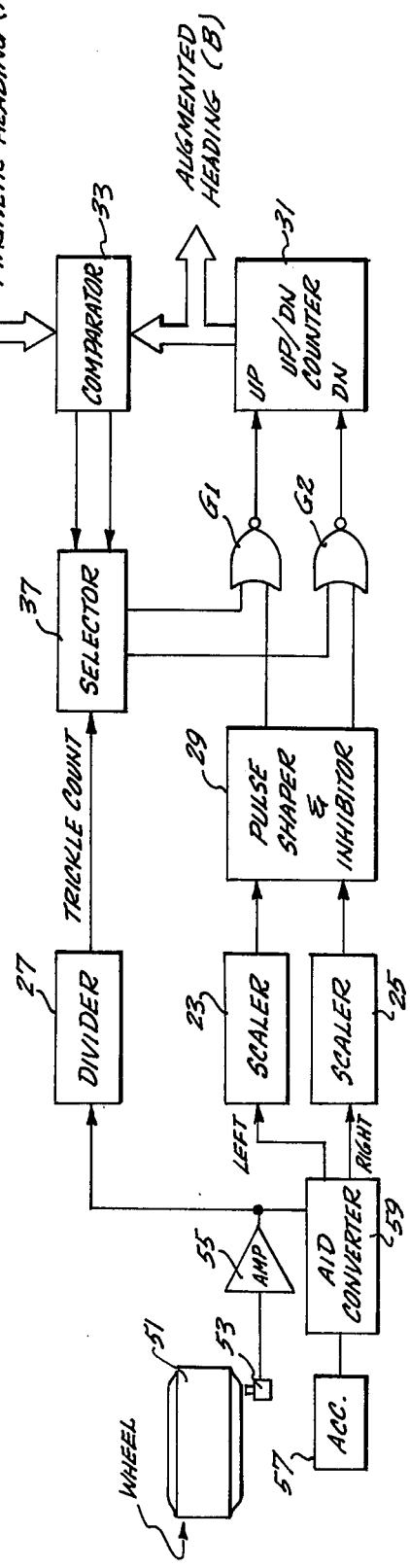

COMPENSATED VEHICLE HEADING SYSTEM

BACKGROUND OF THE INVENTION

This invention is directed to heading determination and, more particularly, to the determination of the heading of a vehicle.

In the past, a variety of devices for providing information related to the heading of a vehicle have been proposed and used. The most common of these devices is a simple compass that, as is well known, provides heading information by relating a needle in alignment with the earth's magnetic field to a compass card. While such devices are adequate to provide a general indication of direction, they are relatively inaccurate. The primary reason they are inaccurate is that the earth's magnetic field has distortions (magnetic anomalies) in localized areas due to magnetizable materials such as bridges, pipelines, etc. These magnetic anomalies distort the localized earth's magnetic field whereby the compass direction indication is distorted.

As an alternative to a magnetic compass, relatively sophisticated gyroscopic indicators have been proposed for use in many vehicles, particularly aircraft and large ocean going vessels. While such sophisticated devices overcome some of the above noted problems of magnetic compasses, they are obviously expensive and, therefore, not suitable for widespread use.

In recent years, attempts have been made to develop vehicle location monitoring systems that provide an indication of the location of vehicles in a predetermined area. For example, attempts have been made to provide vehicle location monitoring systems for monitoring the location of police vehicles on the streets of a city. Some of these systems utilize the principles of dead reckoning and require accurate, relatively inexpensive, heading sensors. Obviously, while inexpensive, compass systems do not provide the necessary accuracy. And, gyroscopic type systems are more expensive than desirable.

In an attempt to overcome some of the foregoing problems, sophisticated, but uncomplicated, magnetic devices have been proposed. One such device is described in U.S. Pat. No. 3,895,869 entitled "Heading Sensor with Compensation Windings" issued to Richard W. Lewis. While the device described in that patent overcomes many of the disadvantages of prior art magnetic compasses, certain disadvantages remain. More specifically, while magnetic information of the type generated by the invention described in the foregoing patent is accurate when averaged over long distances, it is not as accurate as desirable over short distances, particularly in areas where the localized earth's magnetic field is distorted. The present invention is primarily directed to overcoming this disadvantage of an entirely magnetic vehicle heading system.

Therefore, it is an object of this invention to provide a new and improved vehicle heading system.

It is also an object of this invention to provide a compensated vehicle heading system.

It is a further object of this invention to provide a new and improved vehicle heading system suitable for use in vehicle location monitoring systems.

It is another object of this invention to provide a new and improved vehicle heading system that has excellent accuracy, yet is low in cost.

SUMMARY OF THE INVENTION

In accordance with principles of this invention, a compensated vehicle heading system is provided. The compensated vehicle heading system of the invention combines magnetic heading information provided by a magnetic heading sensor with heading information generated by a vehicle dynamic heading sensor. The combined information results in the production of an augmented heading signal that is accurate over short time periods, as well as over long time periods.

In accordance with further principles of this invention, the magnetic heading sensor is preferably a compensated magnetic heading sensor of the type disclosed in U.S. Pat. No. 3,895,869 referenced above. The vehicle dynamic heading sensor comprises a mechanism for sensing movement of the vehicle and proving an output signal or signals related thereto. A comparator compares the magnetic heading information with the vehicle dynamic heading information and provides an output indicative of whether or not the heading information derived from the two sources is the same.

In accordance with still further principles of this invention, the vehicle is a land vehicle and the vehicle dynamic heading sensor senses right and left turning movements of the vehicle, with respect to its longitudinal axis. The sensor creates two pulse chains that are applied to, and control, an up/down (UP/DN) counter. The output of the UP/DN counter is compared with a digital signal representing the output of the magnetic heading sensor. The output of the comparator, in turn, controls the application of an increase or decrease trickle count to the UP/DN counter. The output of the UP/DN counter is, thus, a compensated or augmented vehicle heading signal.

In accordance with still further principles of this invention, dynamic movement of the land vehicle is detected by mounting two sensors, such that they sense the rotational movement of the undriven wheels of the vehicle. Each sensor produces a pulse chain that is amplified and scaled. The scaled pulse chains are applied to the up and down inputs of the UP/DN counter. Further, the two pulse chains are cross-coupled such that if the pulses in one pulse chain terminate, no more than one pulse from the other pulse chain can be applied to the UP/DN counter during the termination period.

It will be appreciated from the foregoing summary that the invention provides a new and improved compensated magnetic heading system that provides an output accurate over both the short term and the long term. Distortions of the magnetic portion of the overall system, caused by local magnetic anomalies are compensated for by the vehicle dynamics portion of the system. Vehicle dynamics compensation is provided without the long term advantages of the compensated magnetic heading device being lost. The resultant information, which, preferably, is in digital form, is utilizable by systems adapted to provide vehicle location monitoring. In other words, the invention generates an augmented heading signal that is readily transmittable to a remote location for use in identifying the location of a plurality of vehicles in a specific geographical area, e.g., city. If desired this heading data, plus distance data, can be computer processed at the receiving location and vehicle indicators moved in accordance with a set or rules (algorithm) to maintain the vehicle indicators on realistic paths representing city streets or other drivable surfaces. (This technique is generally referred to as map matching.) The information may be transmitted at relatively short time intervals of 1 to 3 seconds, if desired. In this regard, the time interval between trasmissions should be relatively low in order for each transmission to accurately represent the heading change for the reported distance traveled; that is, the interval between transmissions should be limited such that the vehicle is not likely to make a significant heading change during the chosen interval.

While, preferably, the sensors for sensing vehicle dynamic movement comprise magnetic pickoff devices or dual odometers adapted to measure the rate of rotation of the undriven wheels of a land vehicle, other devices can also be utilized. For example, accelerometers mounted on the vehicle can be utilized. Alternatively, a pickoff designed to measure the angle of turn of the vehicle integrated by the distance travel can be utilized. Still further, gyroscopic mechanisms mounted on the vehicle can be utilized, if desired, even though they are more expensive than desirable.

It will readily be appreciated by those skilled in the art and others, that, while the present invention was developed, and is described, in combination with a land vehicle location monitoring system, it can also be utilized in other vehicles, such as ships and aircraft, if desired. Hence, the invention should not be construed as limited to use with a land vehicle location monitoring system.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a block diagram of a preferred embodiment of a compensated vehicle heading system formed in accordance with the present invention;

DESCRIPTION OF THE PREFERRED EMBODIMENTS

Figure 2:
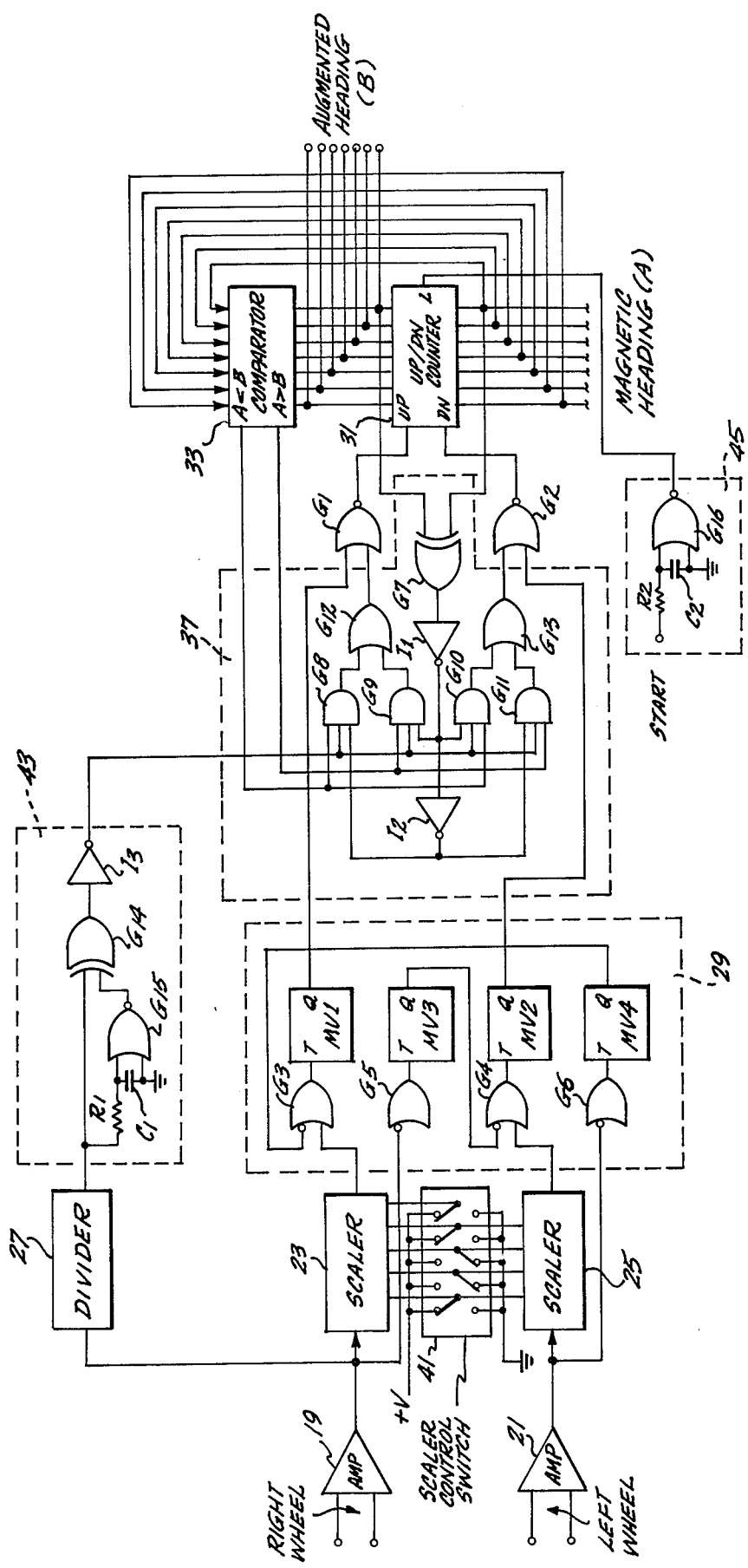
FIG. 2 is a block diagram, somewhat more detailed than FIG. 1, of a portion of the preferred embodiment of the invention illustrated in FIG. 1; and, FIG. 3 is a block diagram of an alternate preferred embodiment of a compensated vehicle heading system formed in accordance with the present invention.

FIG. 1 illustrates right and left wheels 11 and 13 of a land vehicle, for example, an automobile. Because driven wheels can be made to "spin" these wheels are undriven wheels. Thus, in the case of a front wheel drive automobile these are the rear wheels. In the case of a rear wheel drive automobile they are the front or steering wheels. The rate of rotation of these wheels are sensed by magnetic sensors 15 and 17. The magnetic sensors are mounted such that they sense the rate of movement of ferrous magnetic objects (e.g. teeth) suitably positioned about the internal periphery of the right and left wheels 11 and 13. Assuming that the teeth are equally spaced in a ring about the internal periphery of the right and left wheels, it will be appreciated that each time one of the teeth passes the associated magnetic sensor 15 or 17, the magnetic sensor will generate a pulse.

The outputs of the first and second magnetic sensors 15 and 17 are connected to the inputs of first and second squaring amplifiers 19 and 21, respectively. The outputs of the first and second squaring amplifiers 19 and 21 are connected to the inputs of first and second scalers 23 and 25. In addition, the output of the first squaring amplifier 19 is connected to the input of a divider 27.

The outputs of the first and second scalers 23 and 25 are connected to the inputs of a pulse shaper and inhibitor 29. The pulse shaper and inhibitor 29 has two outputs. The first output is connected to one input of a first two-input NOR gate designated G1. The second output is connected to one input of a second two-input NOR gate designated G2. The output of G1 is connected to the up input of an up/down (UP/DN) counter 31 and the output of G2 is connected to the down input of the UP/DN counter 31. The outputs of individual stages of the UP/DN counter are connected to one set of inputs of a comparator 33.

The outputs of a magnetic heading sensor 35, preferably of the type described in U.S. Pat. No. 3,895,869, referenced above, after being appropriately converted from analog form to parallel digital form are applied to a second set of inputs of the comparator 33. The comparator 33, in a conventional manner, compares its two sets of inputs, and generates one or the other of two outputs, if the inputs do not compare. Assuming the digital output of the magnetic heading sensor 35, designated as input A to the comparator, is greater than the digital output of the up/down counter, designated as input B to the comparator, an A>B output signal is generated. On the other hand if B is greater than A then a A<B output signal is generated. The terminals at which these two outputs occur are connected to two control inputs of a selector 37. The selector 37 also receives the pulse output of the divider 27, which output is designated a trickle count. In accordance with the status of the A>B and A<B outputs of the comparator 33, the selector 37 controls the passage of the trickle count pulses to either the second input of G1 or the second input of G2.

Turning now to a description of the operation of the embodiment of the invention illustrated in FIG. 1, the vehicle turn angle is determined by the outputs of the magnetic sensors 15 and 17. If the wheels are rotated for a left turn, the right wheel will rotate during the trun at a faster speed than the left wheel. Thus, the pulses produced by the first magnetic sensor 15 will have a higher frequency rate than the pulses produced by the second magnetic sensor 17. These pulses are amplified and squared by the first and second amplifiers 19 and 21. Preferably, the amplifiers have sufficient sensitivity to sense velocities as low as 0.3 MPH. In any event, square wave pulse chains are applied to the first and second scalers 23 and 25.

The scalers cause the differences in the number of pulses in the pulse chains to be made equal to the number of magnetic heading sectors in a 360° turn. In this way, the turn angle determined by the wheel sensing arrangement may be formed such that it can be directly compared to the output of the magnetic heading sensor 35, assuming that the output of the magnetic heading sensor is equated to the same number of sectors in 360°.

The pulse shaper and inhibitor 29 receives the pulse chains produced by the scalers 23 and 25 and reshapes the pulses such that they fall within some predetermined duration range, such as from 30 to 500 ns. Reshaping the pulses reduces to substantially zero the possiblity that two pulses will simultaneously occur.

The inhibitor portion of the pulse shaper and inhibitor 29, as will be better understood from the following description of FIG. 2, prevents more than one count from one wheel being produced when the other wheel stops counting, i.e., if the right wheel sensor 17 stops counting, only one pulse from the left wheel sensor 15 will be passed by the pulse shaper and inhibitor 29 to the up/down counter. While, in an extremely accurate electronic system, the inhibiting portion of the pulse shaper and inhibitor could be eliminated, because in a practical low-cost system, one of the first and second amplifiers 19 and 21 will be more sensitive than the other and, thus, will sense wheel rotation at a lower velocity, an inhibitor will be found to be normally necessary.

The thusly scaled and shaped pulses produced by the rotation of the right wheel are applied to G1 and the pulses produced by the left wheel are applied to G2. A pulse on the output of G1 causes the UP/DN counter 31 to increment by one and a pulse on the output of G2 causes the UP/DN counter 31 to decrement by one. In other words, as is well known in the electronics art, the UP/DN counter does precisely what its name implies. It counts up as pulses are applied to its up input, and counts down as pulses are applied to its down input. Thus, for right turns, where the left wheel magnetic sensor produces pulses at a faster frequency rate than does the right wheel magnetic sensor, the UP/DN counter is decremented and vice-versa for a left turn.

The output of the UP/DN counter is designated as an Augmented Heading (B). The augmented heading is compared in the comparator with the output of the magnetic heading sensor designated as Magnetic Heading (A). If the Magnetic Heading (A) is greater than the Augmented Heading (B), i.e. A>B, then the selector 37 will pass the trickle count pulses received from the divider 27 to G1 causing the UP/DN counter to increment. Conversely, if the Magnetic Heading (A) is less than the Augmented Heading (B), i.e. A<B, then the selector 37 will pass the trickle count pulses to G2, causing the UP/DN counter 31 to decrement.

In the foregoing way, the Augmented Heading (B) is changed toward the Magnetic Heading (A), even if the dual wheel counts are equal. Any distance can be selected by the divider to produce a change in the Augmented Heading toward the Magnetic Heading. In other words, the rate of division controls the rate of change toward the magnetic heading. Thus, if a short distance creates a trickle count pulse, the Augmented Heading will tend to follow the Magnetic Heading very closely. In this regard, preferably, the trickle count pulse distance relationship should be set in accordance with the accuracy of the magnetic sensors 15 and 17. It is pointed out here and should be noted that, since no trickle count occurs while the vehicle is stationary, the Augmented Heading will not be changed toward the Magnetic Heading during the period of time the vehicle is stationary. Thus, the invention provides a distance integration of the compared heading rather than a time integration.

Since the magnetic sensor derived pulses are continuously being applied to both inputs of the UP/DN counter, the output of the UP/DN counter constantly changes an incremental amount determined by the difference between the two inputs. In this regard, when traveling a straight course with a vehicle, each wheel travels the same distance and the UP/DN counter output will constantly register one of two interchanging consecutive numbers. However, since one wheel may have a different diameter, a turn indication may occur even when traversing a straight line. In order to decrease the detrimental effect of such an occurrence, the magnetic sensors should be chosen and positioned so as to maintain an accuracy of $\Delta\theta°$ over a distance of X feet. Then, the trickle count can occur once during each X distance of travel if the Augmented Heading is moved toward the Magnetic Heading by $\Delta\theta°$.

It will be appreciated from the foregoing description that the invention generally comprises a mechanism for comparing a magnetic heading sensor output with a vehicle dynamic sensor output. The result of the comparison is utilized to control a vehicle dynamic information signal, which represents heading information to be utilized by downstream systems, e.g., a vehicle location monitoring system. The invention is relatively uncomplicated, yet eliminates problems of the type created by localized magnetic anomalies distorting the output of a compensated magnetic heading sensor of the type described in U.S. Pat. No. 3,895,869, referenced and discussed above.

FIG. 2 is a block diagram of the embodiment of the invention illustrated in FIG. 1 in more detail and includes the first and second amplifiers 19 and 21; the first and second scalers 23 and 25; the divider 27; the pulse shaper and inhibitor 29; the selector 37; the up/down counter 31; the comparator 33; and, G1 and G2. In addition, FIG. 2 includes: a scaler control switch 41; a trickle pulse time control circuit 43; and, a start circuit 45.

The pulse shaper and inhibitor 29 is illustrated as comprising: four two input control gates designated G3, G4, G5 and G6; and, four retriggerable monostable multivibrators designated MV1, MV2, MV3, and MV4. The selector 37 is illustrated as comprising: a two-input exclusive OR gate designated G7; four three-input AND gates designated G8, G9, G10 and G11; two two-input OR gates designated G12 and G13; and, two inverters designated I1 and I2.

The trickle pulse time control circuit 43 comprises: a two-input exclusive OR gate designated G14; a two-input NOR gate designated G15; an inverter designated I3; and capacitor designated C1; and a resistor designated R1. The start circuit 45 comprises: a two-input NOR gate designated G16; a resistor designated R2; and, a capacitor designated C2.

As with FIG. 1, the output of the magnetic sensor 15, which senses the rate of rotation of the right wheel 11, is applied to the input of the first amplifier 19. The output of the first amplifier 19 is connected to the input of the first scaler 23 and to the input of the divider 27. Similarly, the output of the left wheel magnetic sensor 17 is applied to the input of the second amplifier 21 and the output of the second amplifier 21 is connected to the input of the second scaler 25.

The scaler control switch 41 is a bank of separately operable single-pole, double-throw switches. The common terminals of the switches are connected to similar, selected control inputs of the first and second scaler 23. For example, if the scalers are multiple stage digital dividers, the common terminals would be connected to the stage control inputs such that each divider divides by the same amount, the amount depending upon the scaler control switch setting. One set of remote terminals is connected to a voltage source designated +V and the other set of remote terminals is connected to ground. Thus, the stage control or presetting inputs are either selectively connected to +V or to ground.

The control gates G3, G4, G5 and G6 each include an inverted input, designated with a 0, and a noninverted input. These gates are formed such that, a shift from a high level to a low level on their inverted inputs causes their outputs to shift from a low (zero) level to a high (one) level. With respect to their noninverted inputs, a shift from a low level to a high level causes their outputs to shift from a low level to a high level. In essence these gates are OR gates with an inverter connected to on input.

The noninverted input of G3 is connected to the output of the first scaler 23 and the noninverted input of G4 is connected to the output of the second scaler 25. The output of G3 is connected to the trigger input of MV1 and the output of G4 is connected to the trigger input of MV2.

Only the inverted inputs of G5 and G6 are used; thus, these gates merely form inverters. The inverted input of G5 is connected to the output of the first amplifier 19, and the output of G5 is connected to the trigger input of MV3. The inverted input of G6 is connected to the output of the second amplifier 21, and the output of G6 is connected to the trigger input of MV4. The Q output of MV4 is connected to the inverted input of G3 and the Q output of MV3 is connected to the inverted input of G4. The Q output of MV1 is connected to one input of G1 and the Q output of MV2 is connected to one input of G2.

As generally discussed above, the pulse shaper and inhibitor 29 performs two functions. First, it shortens the duration of the pulse chains produced by the first and second scalers 23 and 25. This function is performed by MV1 and MV2, one for each pulse chain. The second function of the pulse shaper and inhibitor 29 is to inhibit the operation of one channel when the other channel is not producing pulses. This function is performed by MV3 and MV4. For example, if the output of the first amplifier 19 stops producing pulses, the Q output of MV4, shortly thereafter, presents an inhibit (zero) input to the inverted input of G3. Assuming the time constants of the retrigerable monostable multivibrators MV4 and MV1 are appropriately chosen, MV1 will create one pulse, but no further pulses, after the output of the first amplifier 19 achieves a low level state and remains there. A similar action occurs in the opposite channel as a result of a similar operation of MV2 and MV3.

Turning now to the selector 37, the most significant bit (MSB) output of the UP/DN counter 31 is applied to one input of G7 and the MSB bit of Magnetic Heading (A) is applied to the second input of G7. The output of G7 is connected through I1 to one input each of G9 and G10. The output of I1 is also connected through I2 to one input each of G8 an G11. The output of the trickle pulse time control circuit 43 (hereinafter described) is applied to one input each of G8, G9, G10 and G11. The A<B output of the comparator 33 is applied to one input each of G8 and G10. The A>B output of the comparator 33 is applied to one input each of G9 and G11. The outputs of G8 and G9 are connected to the two inputs of G12 and the output of G12 is connected to the second input of G1. The outputs of G10 and G11 are connected to the two inputs G13 and the output of G13 is connected to the second input of G2.

In operation, if the inputs of G7 are the same, the output of G7 is a binary zero, which is inverted by I1 into a binary one. This binary one gates G9 and G10 open and, through I2, gates G8 and G11 close. Contrawise, if the inputs to G7 are different, G9 and G10 are gated closed and G8 and G1 are gated open. Regardless of which gates are open or closed, the A<B and A>B outputs of the comparator 33 control whether G8 and G10, or G9 and G11, pass the trickle pulses occurring at the output of the trickle pulse time control circuit 43. Depending upon which gate is open, when a trickle pulse occurs, that pulse flows through the appropriate gate to either G12 and G13, which, in turn, steer the pulse to either G1 or G2, as the case may be.

Turning now to the control circuit 43, the output of the divider 27 is connected to one input of G14 and through R1 to one input of G15. The same input of G15 is connected through C1 to ground. The second input of G15 is also connected to ground. The output of G15 is connected to the second input of G14. The output of G14 is connected through I3 to the inputs of G8, G9, G10 and G11, as described above.

In operation, when a pulse occurs on the output of the divider 27, G14 immediately produces a pulse. The pulse output of G14 terminates when the time delay circuit formed by R1 and C1 causes the output of G15 to switch states.

The start circuit 45 is provided to cause loading of the UP/DN counter 31 with the Magnetic Heading (A) data upon initiation of the overall system. More specifically, the application of power to the system causes a start pulse to be applied through R2 to the one input of G15. The same input is connected through C2 to ground. The other input of G16 is also connected to ground. Thus, R2 and C3 form a time delay circuit. During the time delay period, a load signal is applied by G16 to the load (L) input of the UP/DN counter 31. The load signal causes the UP/DN counter load in or be preset to the Magnetic Heading (A) level, because the Magnetic Heading (A) inputs are applied to the preset input terminals of the UP/DN counter as well as to one set of "compare" inputs of the comparator 33. Thus, initially, the UP/DN counter's output [Augmented Heading (B)] is the same as Magnetic Heading (A), whereby both inputs to the comparator 33 are equal. After the R2/C2 time delay, the load input to the UP/DN counter terminates and, thereafter, the UP/DN counter counts up and down as pulses occur on the outputs of G1 and G2, as previously described.

FIG. 3 is a block diagram illustrating an alternative embodiment of the invention wherein only the rotation of one undriven wheel (for example, a single undriven wheel 51 or one of a pair of undriven wheels) is sensed by a magnetic sensor 53. The output of the single magnetic sensor 53 is applied to an amplifier 55 in a manner similar to that illustrated in FIG. 2, and discussed above. In the FIG. 3 embodiment, the second magnetic sensor is replaced by an accelerometer 57. The output of the accelerometer 57 is connected to the conversion input of an analog-to-digital (A/D) converter 59. The output of the amplifier 55 is applied to the sample input of the A/D converter 59 and to the divider 27. The A/D converter 59 produces right and left outputs which are applied, respectively, to the inputs of two scalers 23 and 25, equivalent to the two scalers illustrated in FIGS. 1 and 2 and previously described. Except for those differences, the remaining circuitry illustrated in FIG. 3 is substantially identical to that illustrated in FIG. 1 and, therefore, will not be further described.

In operation, the accelerometer 57, which is mounted in the vehicle whose heading is to be determined, produces an analog output in a conventional manner. The direction of the analog output is determined by the direction of acceleration and the magnitude is determined by the magnitude of acceleration. This output is converted by the A/D converter 59 into a digital output, with the rate of sampling being determined by the pulse output of the amplifiers. Whether the digital output produces pulses on the left output line or the right output line is determined by the direction of acceleration. Thus, if a turn is made to the left, pulses are applied to the first scaler 23 and if a turn is made to the right, pulses are applied to the second scaler 25. The scaler outputs are shaped and inhibited by the pulse shaper and inhibitor 29, which functions generally as described above but, necessarily, in a slightly different manner with respect to inhibiting due to the manner of pulse generation. The pulses outputs of the pulse shaper and inhibitor are applied through G1 and G2 to the up and down inputs of the UP/DN counter 31. Again, the scalers are controlled such that, preferably, the number of pulses for a 360° turn are directly comparable to the number of sectors of the output of the Magnetic Heading (A). Moreover, the pulse output of the amplifier is divided by the divider 27 to provide trickle pulses whose passage to G1 and G2 is controlled by the selector 37 in accordance with the output of the comparator 33, in the manner previously described.

It will be appreciated from the foregoing description that the invention provides an uncomplicated, but accurate, vehicle heading system. The combination of magnetic heading information with vehicle dynamic heading information results in the production of augmented heading information which is accurate not only over long distances, but also over short distances. The errors caused by localized magnetic disturbances e.g., magnetizable materials located locally to the vehicle, are reduced to a point where they are essentially negligible. Yet, this desired result is accomplished without the inclusion of expensive gyroscopic or electronic system. Hence, the invention is suitable for widespread use, particularly, in vehicle location monitoring systems adapted to produce information regarding the location of a multitude of vehicles in a predetermined geographic area. It should be recognized, however, that, as pointed out above, the invention is also useful in other environments where accurate and inexpensive heading systems are desired. Hence, the invention can be practiced otherwise than as specifically described herein.

The embodiments of the invention in which an exclusive property or privilege is claimed are defined as follows:

1. A compensated vehicle heading system for use with a land vehicle including at least one undriven wheel, said compensated vehicle heading system comprising:
   a magnetic heading sensor for magnetically sensing the heading of a vehicle and generating a first heading signal in accordance therewith;
   a vehicle dynamic heading sensor for sensing changes in the direction of a vehicle by sensing the dynamic movement of the vehicle and generating a second heading signal in accordance therewith, said vehicle dynamic heading sensor including a first rotation sensing means for sensing the rotation of said at least one undriven wheel;
   comparison means connected so as to receive said first and second heading signals for comparing said first and second heading signals and generating an output denoting whether or not said signals are different, and, if so, which signal is greater; and,
   control means connected to said comparison means and to said vehicle dynamic heading sensor for increasing or decreasing the magnitude of said second heading signal in accordance with the output of said comparison means so as to move said second heading signal toward said first heading signal.

2. A compensated vehicle heading system as claimed in claim 1 wherein:
   said first and second heading signals are digital signals; and,
   said comparison means is a digital comparator having a first output indicating that said first heading signal is greater than said second heading signal and a second output indicating that said first heading signal is less than said second heading signal.

3. A compensated vehicle heading system as claimed in claim 2 wherein said land vehicle includes a second undriven wheel and wherein said vehicle dynamic heading sensor includes a second rotation sensing means for sensing the rotation of said second undriven wheel.

4. A compensated vehicle heading system as claimed in claim 3 wherein said vehicle dynamic sensor includes:
   scaling means connected to said first and second rotation sensing means for scaling the output thereof; and,
   an up/down counter connected to said scaling means for counting up in accordance with the output of one of said rotation sensing means and down in accordance with the output of the other of said rotation sensing means, the output of said up/down counter being connected to one input of said comparison means.

5. A compensated vehicle heading system as claimed in claim 4 including a pulse shaper and inhibitor connected between the output of said scaling means and the input of said up/down counter.

6. A compensated vehicle heading system as claimed in claim 5 wherein each of said first and second rotation sensing means includes a magnetic sensor mounted so as to sense the rotation of its respective one of said pair of undriven wheels.

7. A compensated vehicle heading system as claimed in claim 6 wherein said control means includes:
   a divider connected to receive the output of one of said magnetic sensors and provide, in accordance with said output, a trickle pulse count; and,
   a selector, said selector connected to receive the outputs of said comparator and, in accordance therewith, apply said trickle count to one of said up and down inputs of said up/down counter.

8. A compensated vehicle heading system as claimed in claim 2 wherein said vehicle dynamic sensor includes an up/down counter connected to receive said first and second heading signals for counting in one direction in accordance with the occurrence of pulses in said first heading signal and in the other direction in accordance with the occurrence of pulses in said second heading signal, the output of said up/down counter being connected to one input of said comparison means.

9. A compensated vehicle heading system as claimed in claim 8 wherein said control means includes:
    a divider connected to receive one of said first and second heading signals and provide a trickle pulse count; and,
    a selector, said selector connected to receive the output of said comparator and, in accordance therewith, apply said trickle count to one of said up and down inputs of said up/down counter.

10. A compensated vehicle heading system as claimed in claim 3 wherein each of said first and second rotation sensing means includes a magnetic sensor mounted so as to sense the rotation of its respective one of said pair of undriven wheels.

11. A compensated vehicle heading system as claimed in claim 1 wherein said vehicle dynamic heading sensor also includes:
    an accelerometer mounted on said vehicle for detecting the acceleration of said vehicle along a predetermined axis and producing an output whose magnitude is related to the magnitude of the acceleration sensed by said accelerometer and whose direction is related to the direction of the acceleration sensed by said accelerometer; and,
    an analog-to-digital converter having an output control input connected to the output of said accelerometer and a rate control input connected to the output of said rotation sensing means, said analog-to-digital converter having selectable left and right outputs, which of said outputs is selected being determined by the direction of the acceleration sensed by said accelerometer as denoted by the direction of the output of said accelerometer.

12. A compensated vehicle heading system as claimed in claim 11 wherein:
    said first and second heading signals are digital signals; and,
    said comparison means is a digital comparator having a first output indicating that said first heading signal is greater than said second heading signal and a second output indicating that said first heading signal is less than said second heading signal.

13. A compensated vehicle heading system as claimed in claim 12 wherein said vehicle dynamic sensor includes an up/down counter connected to said analog-to-digital converter for counting up in accordance with one output of said analog-to-digital converter and down in accordance with the other output of said analog-to-digital converter, the output of said up/down counter being connected to one input of said comparison means.

14. A compensated vehicle heading system as claimed in claim 13 including a scaling means, and a pulse shaper and inhibitor all connected between the output of said analog-to-digital converter and the input of said up/down counter.

15. A compensated vehicle heading system as claimed in claim 14 wherein said rotation sensing means includes a magnetic sensor mounted so as to sense the rotation of said at least one wheel.

16. A compensated vehicle heading system as claimed in claim 15 wherein said control means includes:
    a divider connected to receive the output of said magnetic sensor and provide a trickle pulse count; and,
    a selector, said selector connected to receive the outputs of said comparator and, in accordance therewith, apply said trickle count to one of said up and down inputs of said up/down counter.

* * * * *